United States Patent [19]

Ooi

[11] Patent Number: 4,717,893

[45] Date of Patent: Jan. 5, 1988

[54] SPATIAL LIGHT MODULATOR

[75] Inventor: Yoshiharu Ooi, Hamamatsu, Japan

[73] Assignee: Hamamatsu Photonics Kabushiki Kaisha, Hamamatsu, Japan

[21] Appl. No.: 727,250

[22] Filed: Apr. 25, 1985

[30] Foreign Application Priority Data

May 4, 1984 [JP] Japan ................................ 59-89637
Sep. 14, 1984 [JP] Japan ................................ 59-193136

[51] Int. Cl.[4] .............................................. H01S 3/00
[52] U.S. Cl. ...................................... 332/7.51; 350/374
[58] Field of Search ................. 332/7.51; 350/374, 393

[56] References Cited

U.S. PATENT DOCUMENTS 3,882,454  5/1975  Marie et al. ........................ 350/393
4,481,531 11/1984  Warde et al. ....................... 350/374

FOREIGN PATENT DOCUMENTS 1123840  8/1968  United Kingdom .
1173727 12/1969  United Kingdom .
1427925  3/1976  United Kingdom .
1433807  4/1976  United Kingdom .

Primary Examiner—Salvatore Cangialosi
Attorney, Agent, or Firm—Spencer & Frank

[57] ABSTRACT

Improved spatial light modulators, each consisting of an electron beam source formed within a vacuum envelope, i.e., a photoelectric layer; and a electro-optical crystal to store electrons emitted from the electron beam source as a charge to change the optical refraction index thereof. The charge storage surface of the electro-optical crystal constitutes a dielectric multilayer mirror or a specific dielectric film layer whose surface resistance is high and stable enough to store the charge in a high vacuum of $10^{-7}$ torr at an elevated temperature of 350° C.

2 Claims, 6 Drawing Figures

A. $SiO_2$, $LiNbO_3$
B. $ZrO_2$
C. $Al_2O_3$
D. $MgO$
E. $BaF_2$
F. $CaF_2$

SPATIAL LIGHT MODULATOR

BACKGROUND OF THE INVENTION

The present invention relates to a spatial light modulator wherein the electron beam source and electro-optical crystal are arranged within a vacuum envelope so that photoelectrons emitted from the electron source are stored onto the surface of the crystal so as to change the refractive index corresponding to the charge stored on the crystal surface, and the refraction index change is read out by a laser beam.

The operation of the spatial light modulator as well as fabrication thereof will briefly be described hereinafter and problems concerning the surface resistivity change and long erase/write times to limit the operation speed are then referred to.

FIG. 1 is a schematic diagram of a spatial light modulator in which the photoelectric layer, electrodes, and opto-electronic crystal are arranged. Now, the conventional techniques will be described referring to FIG. 1.

The image obtained by an incident light pattern is formed on photoelectric layer 4 inside glass envelope 3 of the spatial light modulator when the light is passing through lens 2 while an object is being illuminated by incoherent light.

Photoelectric layer 4 emits photoelectrons responding to the incident light of the image. The photoelectrons are incident on microchannel plate 6 passing through accelerated beam focus lens 5, and multiplied by a factor of the order of thousands. The multiplied electrons are stored on the surface of electro-optical crystal 8, for instance $LiNbO_3$, to change the refractive index of crystal 8 in corresopndence with the charged image. When the laser beam from laser beam source 10 is incident on crystal 8 passing through half mirror 9, laser beam image 11 or a coherent image can be obtained.

An optical calculation a coherent parallel laser beam can be done by using laser beam image 11. Reference number 7 in FIG. 1 indicates a secondary electron collection electrode.

The intensity of laser beam image 11 is directly proportional to charge storage surface 8b of the electro-optical crystal 8. The reflected light intensity is 15% or less compared to the incident light intensity for an electro-optical crystal, i.e., $LiNbO_3$, in accordance with Fresnel's law.

Most of the light incident on crystal 8, passing through crystal 8, is reflected from secondary electron collection electrode 7 and microchannel plate 6, and then superimposed on coherent image 11 as noise components.

Charge storage surface 8b must have a laser beam reflection coefficient large enough to enhance laser beam image 11 while reducing noise.

A dielectic multilayer mirror which can store charges while reflecting the laser beam is preferably formed on the charge storage surface 8b so as to increase the reflection coefficient.

For constructing such a spatial light modulator, electrodes 5 through 8 are first built into glass envelope 3 and photoelectric layer 4 is then formed. Envelope 3 is evacuated until a high vacuum of $10^{-7}$ torr is obtained by exhausting unwanted gases from the envelope 3 at an elevated temperature of 350° C. during the fabrication process.

The mirror used in a spatial light modulator should be a dielectric multilayer mirror that is electro-optically and mechanically stable under high vacuum conditions at an elevated temperature and which has a high surface resistance wherein charges can stably be stored for a long period of time.

A dielectric multilayer mirror which can reflect the light at wavelength $\lambda o$ consists of a number of dielectric layers of high refractive index, stacked at a thickness of $\lambda o/4n$, where "n" indicates the refractive index of the dielectric material. Dielectric materials with high and low refractive indices are alternately deposited every other $\lambda o/4n$ thickness.

Among the materials for making dielectric multilayer mirrors, $SiO_2$ is known as a dielectric material of low refractive index, and $TiO_2$ and $CeO_2$ are known as dielectric materials of high refractive index. A dielectric multilayer mirror using $SiO_2$ and $TiO_2/CeO_2$ is well known for use with conventional techniques.

This type of mirror is composed of 10 to 20 layers where a reflection coefficient of 90% or more is obtained at a wavelength of $\lambda o$, and the surface resistance of the mirror, however, decreases independently of both the evaporation process and the number of layers when kept at an elevated temperature of 350° C. under a high vacuum of $10^{-7}$ torr. This type of mirror cannot be used to store charges in its charge storage areas.

A dielectric multilayer mirror consisting of $SiO_2$ as a low refractive index material and $Al_2O_3$ as a high refractive index material has a problem caused by peeling of the film layers from the substrate during heat treatment described heretofore.

Table 1 summarizes the surface resistances of dielectric multilayer mirrors of different types fabricated to conform a He-Ne laser (which can emit a laser beam at $\lambda o = 632.8$ nm) before and after heat treatment. That is, the surface resistance of each dielectric multilayer mirror is of the order of $10^{16}$ ohms/square before the heat treatment, and it decreases or becomes unstable after the heat treatment.

TABLE 1

| Dielectric material mirror | (Unit: ohms/□) | | |
|---|---|---|---|
| | Room temperature | 24 hours at 200° C. | 24 hours at 350° C. |
| $SiO_2$—$TiO_2$ | >$10^{16}$ | $10^{10}$ | $10^6$ |
| $SiO_2$—$CeO_2$ | >$10^{16}$ | $10^{14}$ | $10^{12}$ |
| $SiO_2$—$Al_2O_3$ | >$10^{16}$ | >$10^{16}$ | peeling |

Next, how to write the charge image into the spatial light modulator or to erase the charge image from the spatial light modulator will be explained hereinafter referring to FIG. 2. FIG. 2 is a view, partly in section, of the charge multiplication, charge storage, and laser beam output portions of the spatial light modulator.

Assume that the surface voltage on charge storage surface 81b of the crystal is Vs and that the surface voltage on the opposite surface 81a of the crystal is Vb. Then, voltage $Vx(Vx=Vs-Vb)$ appearing across surfaces 81a and 81b corresponding to the laser beam intensity used to read out the image is expressed in terms of the physical parameters of the electro-optical crystal and half-wave voltage $V\pi$ which depends on the wavelength of the laser beam.

The charge image is written into or erased from the spatial light modulator by applying charge $Q\pi$ corresponding to half-wave voltage $V\pi$ to charge storage surface 81b. Charge $Q\pi$ can be supplied by the secondary electrons emitted from the crystal surface material responding to the primary electrons incident on the surface thereof.

Ratio $\delta$ of the secondary electrons emitted from the crystal surface material to the primary electrons incident on the surface thereof depends on surface voltage Vs of the crystal, as shown in FIG. 3 when charges are written into or erased from the spatial light modulator.

FIG. 3 shows the ratio $\delta$ of secondary electrons to primary electrons for the materials of thin films formed on the charge storage surfaces of an electro-optical crystal for the spatial light modulator, which is represented in terms of crystal surface voltage Vs.

Vc is the voltage applied to the secondary electron collection electrode. The ratio of the secondary electrons to the primary electrons or $\delta$ is given by the broken line in FIG. 3, and the broken line indicates the curve for no secondary electron collection electrode provided. If voltage Vs across the crystal surfaces is equal to or greater than Vc when the secondary electron collection electrode is provided, electrons emitted from the crystal surface are pulled back to the crystal surface again. In this range, $\delta$ actually becomes zero. The solid line in FIG. 3 indicates this operation.

While a write/erase operation is being performed, let the response time for $\delta > 1$ (supplying positive charges) be $\tau\delta$ and that for $\delta < 1$ (supplying negative charges) be $\tau o$.

Response times $\tau\delta$ and $\tau o$ are given for hatched areas (A) and (B), respectively, and these times can be given by expression (1):

$$\left. \begin{array}{l} \tau o = (\epsilon V\pi/l)\cdot(1/\alpha Jo) \\ \tau\delta = \tau o/(\bar{\delta} - 1) \end{array} \right\} \quad (1)$$

where:
l: thickness of the crystal
$\epsilon$: dielectric constant along the crystal thickness
Jo: output current density in the microchannel plate
$\bar{\delta}$: averaged $\bar{\delta}$ in hatched area (A)
$\alpha$: electron transmissivity of the secondary electron collection electrode.

Response time $\tau o$ for $\delta < 1$ is given by expression (1) independently of the material of charge storage surface 81b, and it is expressed in terms the physical parameter $\epsilon V\pi/l$ of the crystal, output current density Jo of the microchannel plate, and electron transmissivity $\alpha$ of the secondary electron collection electrode.

The more $\bar{\delta}$ or $\delta max$ given by expression (1) increases in hatched area (A) of FIG. 3, the more response time $\tau\delta$ becomes short if $\delta > 1$ is satisfied.

For constructing a spatial light modulator, focusing lens 5, microchannel plate 6, secondary electron collection electrode 7, and opto-electric crystal 8 are first built into glass envelope and photoelectric layer 4 is then formed.

Envelope 3 is evacuated until a high vacuum of $10^{-7}$ torr is obtained by exhausting unwanted gases from the envelope 3 at an elevated temperature of 350° C. during fabrication process.

The charge storage material used in a spatial light modulator should be such a charge storage material that it is electro-optically and mechanically stable under high vacuum conditions at an elevated temperature and which has a surface resistance wherein charges can stably be stored for a long period of time.

The charge storage surface of the conventional spatial light modulator is a polished surface of the electro-optical crystal or an $SiO_2$ film formed on the polished surface of the electro-optical crystal. Using electro-optical crystal $LiNbO_3$ with a thickness of 350 μm and a half-wave voltage $V\pi$ of 1.3 kV, response times $\tau\delta$ and $\tau o$ were measured at an output current density of 2 μA/cm$^2$ on microchannel plate 6. Response times $\tau\delta$ and $\tau o$ were 100 ms or more, respectively, and changed as shown in FIG. 4 where response times are represented in terms of secondary electron collection electrode voltage Vc.

FIG. 4 shows how response times $\tau\delta$ for $\delta > 1$ and $\tau o$ for $\delta < 1$ in the conventional spatial light modulator depend on secondary electron collection electrode voltage Vc.

The first objective of the present invention is to present a spatial light modulator which can provide an excellent laser beam image while solving such a problem that the surface resistivity of the deposited film decreases and becomes unstable after heat treatment.

The second objective of the present invention is to present a spatial light modulator which can provide an excellent laser beam image while solving such a problem that the response times in the write/erase operation are much longer than those required.

SUMMARY OF THE INVENTION

The spatial light modulator to accomplish the first objective of the present invention consists of an electron beam source formed within a vacuum envelope, and an electro-optical crystal to store electrons emitted from the electron beam source as a charge to change the optical characteristics or refractive index thereof, where the charge storage surface of the electro-optical crystal constitutes a dielectric multilayer mirror whose surface resistance is high and stable enough to store the charge at an elevated temperature under high vacuum conditions. The first objective of the present invention can completely be actualized in accordance with the first principle of the present invention.

The spatial light modulator to accomplish the second objective of the present invention consists of an electron beam source formed within a vacuum envelope, and an electro-optical crystal to store electrons emitted from the electron beam source as a charge to change the optical characteristics thereof; where the charge storage surface of the electro-optical crystal constitutes a dielectric film layer with high secondary electron emissivity whose surface resistance is high and stable enough to store the charge at an elevated temperature under high vacuum conditions.

The second objective of the present invention can completely be actualized in accordance with the second principle of the present invention.

DESCRIPTION OF THE PREFERRED EMBODIMENTS

Figure 1:
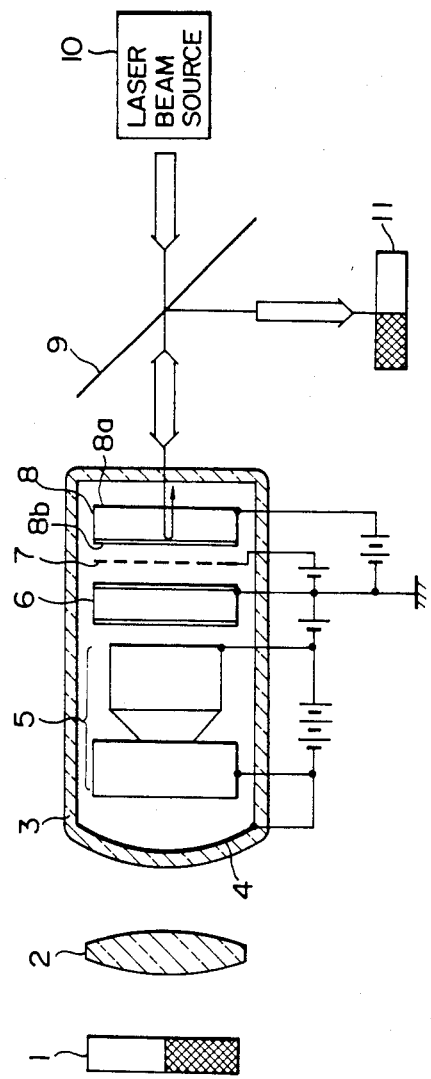
FIG. 1 is a schematic view of the fundamental structure of a conventional spatial light modulator and embodiments of the spatial light modulator according to this invention.
Figure 2:
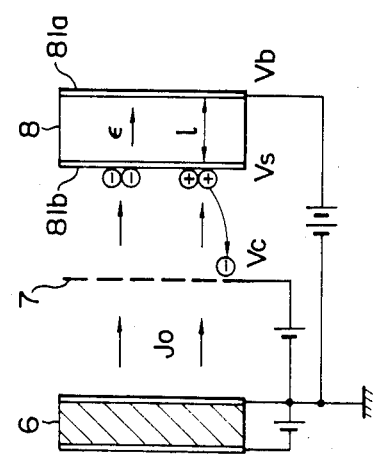
FIG. 2 is a view, partly in section, of the charge multiplication, charge storage and laser beam output portions of the first and second embodiments of the spatial light modulation of this invention.
Figure 3:
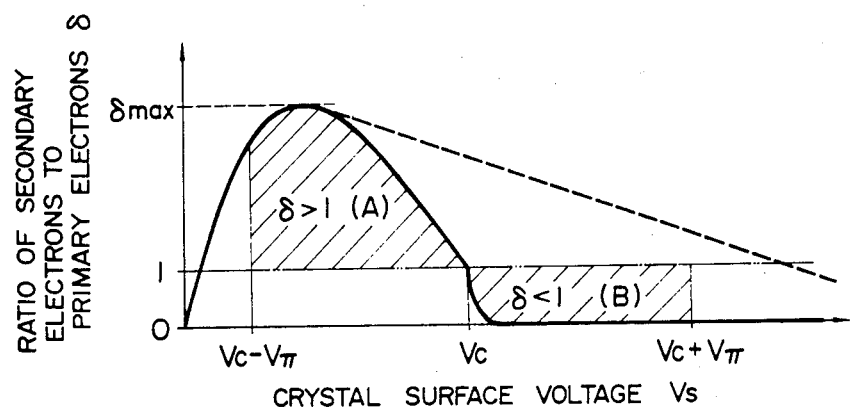
FIG. 3 is a graph showing the ratio $\delta$ of secondary electrons to primary electrons for the materials of thin films formed on the charge storage surfaces of an electro-optical crystal for the spatial light modulator according to the present invention.
Figure 4:
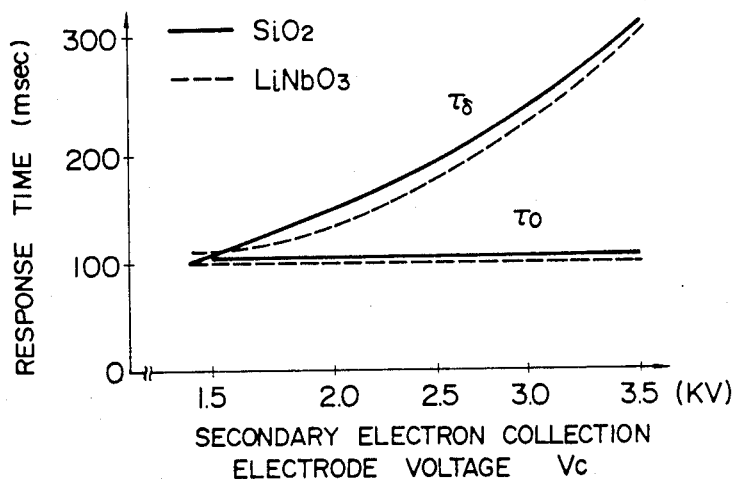
FIG. 4 is a graph showing how response times $\tau\delta$ for $\delta > 1$ and $\tau o$ for $\delta < 1$ in the conventional spatial light modulator depend on secondary electron collection electrode voltage Vc.

The present invention will be described referring to the drawings.

The cross-sectional view of the spatial light modulator in accordance with the present invention is the same as that of the conventional modulator which is shown and has been described above with reference to FIG. 1.

Figure 5:
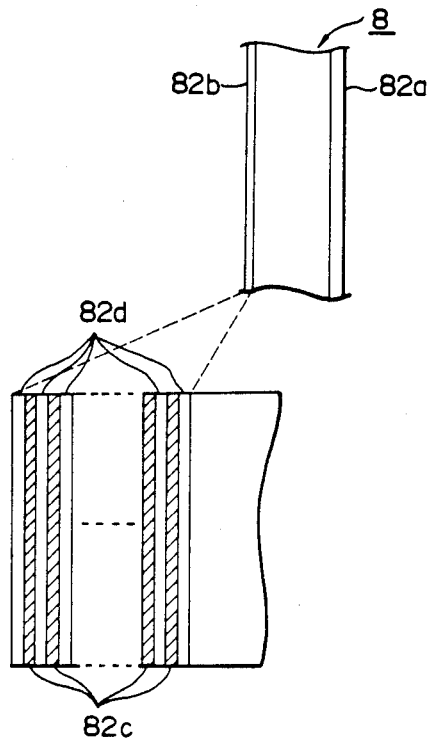
FIG. 5 is a view, partly in section, of the extended portions of the electro-optical crystal and dielectric multilayer mirror for use in the spatial light modulator according to the present invention.

FIG. 5 is a view, partly in section, of the extended portions of the electro-optical crystal and dielectric multilayer mirror for use in the spatial light modulator built in accordance with the present invention.

Figure 6:
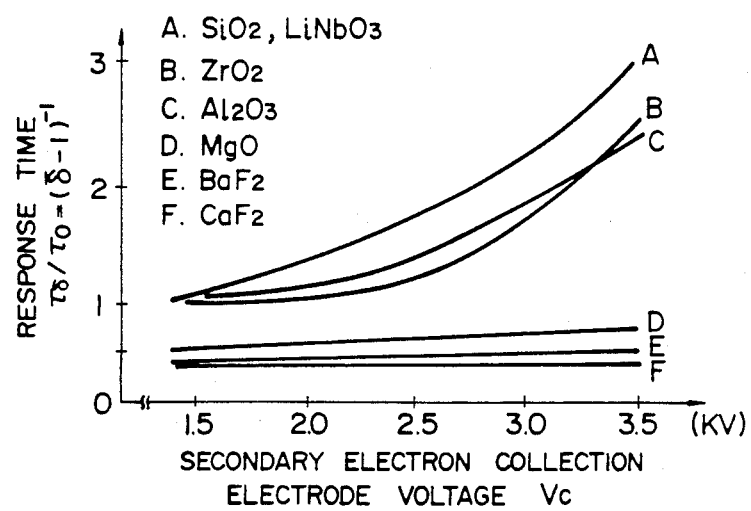
FIG. 6 is a graph showing how normalized response time $\tau\delta/\tau o$ for the spatial light modulator according to the present invention depend on secondary electron collection electrode voltage Vc.

FIG. 6 is a graph showing how normalized response time $\tau\delta/\tau o$ for the spatial light modulator in accordance with the present invention depend on secondary electron collection electrode voltage Vc.

The configuration and operation of the first embodiment of the spatial light modulator in accordance with the present invention are the same as those of FIG. 1.

In the first embodiment of the present invention, a dielectric multilayer mirror which is stable with reduced optical noise components at an elevated temperature under high vacuum conditions is formed on the charge storage surface of the opto-electric crystal in order to obtain a laser beam image stronger than that which has ever been obtained before.

FIG. 5 shows part of the extended view of the electro-optical crystal, which is used for the spatial light modulator built in accordance with the first objective of the present invention, together with the dielectric multilayer mirror extended for easy understanding.

Reference number 82a in FIG. 5 indicates a transparent conductive layer formed on the surface of the electro-optical crystal 8 or LiNbO$_3$, on which the laser beam is incident. Reference number 82b indicates a dielectric multilayer mirror made of ZrO$_2$ as a dielectric material having a high refractive index and SiO$_2$ as a dielectric material having a low refractive index, which are fabricated in accordance with the process described hereinafter.

Dielectric materials ZrO$_2$ and SiO$_2$ are alternately deposited by RF sputtering onto the charge storage surface of electro-optical crystal 8 heated within an Argon ambient containing oxygen O$_2$ so as to form an overcoating consisting of 10 to 20 layers in the multilayer mirror 82b.

The surface resistance of the dielectric multilayer mirror formed by the process was $10^{16}$ ohms/square or more when measured at an elevated temperature of 350° C. at a high vacuum of $10^{-7}$ torr and no dielectric multilayer films were peeled. In addition, these films were optically stable.

Such a spatial light modulator structure as shown in FIG. 1 was built by using electro-optical crystal LiNbO$_3$ where the dielectric multilayer mirror had been formed, and it was then exhausted to eliminate gases and heat treatment was carried out. Thereafter, the spatial light modulator was operated. The spatial light modulator was verified to have the capability to store the charge image for a time duration which is a multiple of 10 hours.

The intensity of the laser beam reflected from the electro-optical crystal was increased and optical noise components were reduced.

Other multilayer materials than ZrO$_2$ to be used as a dielectric material with high refractive index and SiO$_2$ to be used as a dielectric material with low refractive index can favorably be used to fabricate a dielectric multilayer mirror.

HfO$_2$, Ta$_2$O$_5$ or Nb$_2$O$_5$ can be used as a dielectric material with high refraction index to fabricate a dielectric multilayer mirror consisting of the HfO$_2$-SiO$_2$, Ta$_2$O$_5$-SiO$_2$ or Nb$_2$O$_5$-SiO$_2$ system. Dielectric multilayer mirrors made by HfO$_2$-SiO$_2$, Ta$_2$O$_5$-SiO$_2$ or Nb$_2$O$_5$-SiO$_2$ were fabricated and heat treatment was carried out under high vacuum conditions. No dielectric multilayer films, however, were peeled and the surface resistance of the dielectric multilayer mirror was $10^{16}$ ohms/square or more.

The dielectric multilayer mirror was verified to have the capability to store the charge for a time duration which is a multiple of 10 hours in a spatial light modulator. In addition, the intensity of the laser beam reflected from the dielectric multilayer mirror was increased and optical noise components were reduced.

The configuration and operation of the second embodiment of the spatial light modulator built in accordance with the present invention are the same as those of FIG. 1.

In the present invention, a thin film with high secondary electron emissivity which is stable at an elevated temperature under high vacuum conditions is formed on the charge storage surface of the opto-electric crystal in order to obtain short response times while the charge image is written into or erased from the charge storage surface.

The surface resistance of such an MgO, ZrO$_2$, Al$_2$O$_3$, BaF$_2$ or CaF$_2$ film as formed on the charge storage surface of the spatial light modulator by vacuum evaporation or RF sputtering was $10^{16}$ ohms/square or more when measured at an elevated temperature of 350° C. at a high vacuum of $10^{-7}$ torr and no films were peeled. In addition, these films were optically stable.

Such a spatial light modulator as shown in FIG. 1 was built by using electro-optical crystal LiNbO$_3$ where the thin films had been formed and it was then exhausted to eliminate gases and heat treatment was carried out. Thereafter, the spatial light modulator was operated.

The spatial light modulator built in accordance with the second embodiment of the present invention was verified to have the capability to store the image charge for more than one hour.

Using electro-optical crystal LiNbO$_3$ with a thickness of 350 $\mu$m and a half-wave voltage $V\pi$ of 1.3 kV, response times $\tau\delta$ and $\tau o$ of the spatial light modulator were measured at an output current density of 2 $\mu$A/cm$^2$ on microchannel plate 6. Response time $\tau o$ for $\delta < 1$ was 100 ms independently of both the material coated on the charge storage surface of the crystal and of secondary electron collection electrode voltage Vc.

Response time $\tau\delta$ for $\delta > 1$ increases with an increase in secondary electron collection electrode voltage Vc depending on the material.

Normalized response time $\tau\delta/\tau_0$ depends only on $\overline{\delta}$ for the material of the charge storage surface, as expected in expression (1). FIG. 6 shows normalized response time $\tau\delta/\tau_0 = (\overline{\delta}-1)^{-1}$ with coated materials $SiO_2$, $ZrO_2$, $Al_2O_3$, MgO, $BaF_2$ and $CaF_2$ as parameters when each material is formed on crystal $LiNbO_3$ to build a spatial light modulator. In FIG. 6, the normalized response times are represented in terms of secondary electron collection electrode voltage Vc.

Response time $\tau\delta$ for crystal $LiNbO_3$ with the charge storage surfaces whereon $ZrO_2$, $Al_2O_3$, MgO, $BaF_2$ or $CaF_2$ is deposited is short compared with that for crystal $LiNbO_3$ with no films coated or with the $SiO_2$ films coated.

Response time $\tau\delta$ for crystal $LiNbO_3$ with the MgO, $BaF_2$ or $CaF_2$ films coated is one half of the response time obtained by the conventional spatial light modulator.

In addition to dielectric materials with high secondary electron emissivity, such a material as $MgF_2$, NaF, LiF, $CeF_3$, $SrF_2$, $Na_3AlF_6$, $HfO_2$, $Ta_2O_5$ or $Nb_2O_5$ can be used to fabricate the spatial light modulator. The surface resistance of such an $MgF_2$, NaF, LiF, $CeF_3$, $SrF_2$, $Na_3AlF_6$, $HfO_2$, $Ta_2O_5$ or $Nb_2O_5$ film as formed in accordance with the above fabrication process may be of $10^{16}$ ohms/square and no films may be peeled.

The spatial light modulator built in accordance with the second embodiment of the present invention was verified to store the charge image for more than one hour, and to have a response time shorter than that of the conventional spatial light modulator for $\delta > 1$.

In the second embodiment of the present invention, a dielectric material layer with high secondary electron emissivity is formed on the charge storage surface of an electro-optical crystal.

In the first and second embodiments of the present invention, photoelectric layers are used as electron beam sources, respectively. However, an electron beam source, such as an electron gun, is possible for writing the image information onto the charge storage surface of the crystal in accordance with the present invention.

As described heretofore, the spatial light modulator of the present invention uses a dielectric multilayer mirror or a dielectric layer with high secondary electron emissivity which keeps the surface resistance high enough to stably store the electron charge thereon in the surface layer of an electro-optical crystal held at an elevated temperature under high vacuum conditions.

In accordance with the first embodiment of the present invention, the light noise components generated by reflected of electrons from the secondary electron collection electrode and microchannel plate are less compared with those generated by the conventional spatial light modulator.

In accordance with the second embodiment of the present invention, the response time changing with the crystal surface voltage applied to the crystal surface area with a secondary electron emissivity of greater than unity is shorter than that obtained by the conventional spatial light modulator.

The spatial light modulator in accordance with the present invention permits its crystal surface to perform the arithmetic and logic operations related to image processing, and it can be used for a variety of applications which will be developed in the future.

What is claimed is:

1. A spatial light modulator comprising
an evacuated envelope;
an electron beam source positioned within said envelope, said electron beam source emitting electrons in response to light incident thereon; and
an electro-optical crystal having a charge storage surface constituting a dielectric multilayer mirror, said electro-optical crystal being made of $LiNbO_3$, and said dielectric multilayer mirror being made of a first plurality of films having a first refractive index and a second plurality of films have a second index which is low compared to that of said first plurality of films, said first plurality of film being selected from the group consisting of $ZrO_2$, $HfO_2$, $Ta_2O_5$ and $Nb_2O_5$, and said second plurality of films being made of $SiO_2$, whereby said dielectric multilayer mirror has a surface resistance which is stable enough to store said charge at an elevated temperature under elevated vacuum conditions.

2. A spatial light modulator comprising
an evacuated envelope;
an electron beam source positioned within said envelope, said electron beam source emitting electrons in response to light incident thereon; and
an electro-optical crystal having a charge storage surface constituting a dielectric material film, with high secondary electron emissivity, deposited on a dielectric multilayer mirror, said electro-optical crystal being made of $LiNbO_3$, and said dielectric material film being selected from a group of fluorides consisting of $MgF_2$, $BaF_2$, $CaF_2$, $NaF_2$, LiF, $SrF_2$, $CeF_3$ and $Na_3AlF_6$, and a group of oxides consisting of $MgO_2$, $Al_2O_3$, $ZrO_2$, $HfO_2$, $Ta_2O_5$ and $Nb_2O_5$, whereby said dielectric material film has a surface resistance which is stable enough to store said charge at an elevated temperature under elevated vacuum conditions.

* * * * *